(12) United States Patent
Baker et al.

(10) Patent No.: US 6,195,545 B1
(45) Date of Patent: Feb. 27, 2001

(54) PROXIMITY-BASED REGISTRATION IN A COMMUNICATION SYSTEM

(75) Inventors: Albert D. Baker, Lincroft; Vincent H. Choy, Hazlet; Venkatesh G. Iyengar, Middletown; James C. Liu, Holmdel; Eileen P. Rose, Spring Lake, all of NJ (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/031,574

(22) Filed: Feb. 27, 1998

(51) Int. Cl.$^7$ ........................................ H04Q 7/00
(52) U.S. Cl. .................. 455/414; 455/435; 455/458; 455/445
(58) Field of Search .................. 455/412, 415, 455/418, 419, 420, 422, 435, 458, 450, 455, 456, 517, 31.1, 31.2, 445, 414

(56) References Cited

U.S. PATENT DOCUMENTS 5,841,837 * 11/1998 Fuller et al. ................... 455/31.2

OTHER PUBLICATIONS

Definity® Enterprise Communications Server, Release 6, Adminstration and Feature Description, "Bridged Call Appearance," pp. 4–109 to 4–124, Aug. 1997.

Definity® Enterprise Comunications Server, Release 6, Adminstration and Feature Description, "Terminal Translation Initialization," pp. 4–562 to 4–569, Aug. 1997.

* cited by examiner

Primary Examiner—Thanh Cong Le
(74) Attorney, Agent, or Firm—Joseph B. Ryan; Ryan, Mason & Lewis, LLP

(57) ABSTRACT

The invention in an illustrative embodiment provides binding and bridging between a mobile terminal and other more complex terminals in a communication system. The binding is based on a determination of the proximity of the mobile to the other terminal, such that the mobile registers to different complex system terminals as it moves between different cells of the system. In accordance with the invention, a proximity-based temporary association is established, in a memory of a system switch, between the mobile and at least one other system terminal. While the mobile is "registered" in this manner to the other terminal, the mobile user can request permission to utilize the functions of the other terminal in order to, for example, receive incoming calls or place outgoing calls. Other embodiments of the invention provide proximity-based registration which utilizes a beacon device carried by the user, such that the user automatically registers to different system terminals as he or she moves about within the system.

14 Claims, 12 Drawing Sheets

PROXIMITY-BASED REGISTRATION IN A COMMUNICATION SYSTEM

RELATED APPLICATIONS

The present application is related to U.S. patent application Ser. No. 09/031,580 entitled "Dynamic Binding and Bridging in a Communication System," and U.S. patent application Ser. No. 09/031,581 entitled "Dynamic Selection of Interworking Functions in a Communication System," each filed concurrently herewith in the names of inventors Albert D. Baker, Vincent H. Choy, Venkatesh G. Iyengar, James C. Liu and Eileen P. Rose, and assigned to the assignee of the present application.

FIELD OF THE INVENTION

The invention relates generally to communication systems, and more particularly to business communication systems in which calls or other incoming communications are directed by a switch to desksets, wireless mobile telephones, or other types of user terminals within the system.

BACKGROUND OF THE INVENTION

A typical business communication system includes an enterprise switch which directs calls from one or more incoming trunks to various user terminals. The user terminals may include, for example, wired desksets, wireless desksets, wireless mobile telephones and advanced terminals such as computers or video telephones. A shared communication facility within such a system is generally represented in both the switch and the corresponding terminals as a "Call Appearance" (CA). When a CA to a shared facility is presented on multiple user terminals, and multiple users are allowed to access this facility, the CA is known as a "bridged appearance." In existing systems, such bridged appearances can generally only be defined at system administration time, for example, during an initial set-up and configuration of the system or during a subsequent system-level reconfiguration. As a result, conventional bridged appearances remain static until the system is re-administered. This conventional static architecture is generally considered best suited for wired terminals, where the operational expectation is that the user associated with a given terminal will be at his or her desk, and will be the primary or exclusive user of that terminal.

However, in systems which support wireless terminals and other more advanced equipment, users will typically have more than one terminal available to them, and may also be allowed to use the advanced equipment on a demand basis. For example, a given set of users may each have a wired deskset, a simple mobile telephone, and access on a random demand basis to an advanced shared resource such as a video telephone. Unfortunately, the above-noted conventional static bridging techniques are unable to create a dynamic bridged appearance that exists on, for example, both the mobile telephone of a given user and an advanced shared resource which happens to be located in proximity to the mobile telephone at a particular time. The conventional techniques therefore generally do not provide the user with an option of answering an incoming call directed to the mobile telephone at a co-located advanced terminal, unless the advanced terminal has been bridged with the mobile telephone during system administration. As a result, the user will often be unable to access the more sophisticated features of a nearby advanced terminal for accepting calls directed to the mobile, or placing calls as a known originator.

SUMMARY OF THE INVENTION

This invention provides a system in which users can be associated with a system terminal on a demand basis by creating a bridged call appearance that exists, for example, on both a simple mobile telephone and a co-located complex terminal such as a video telephone. This invention thus allows the creation of bridged call appearances on a dynamic demand basis. In an illustrative embodiment, a temporary association is established between a mobile terminal and at least one other system terminal. While the mobile terminal is "registered" in this manner to the other terminal, the mobile user can request permission to utilize the functions of the other terminal in order to, for example, receive incoming calls or place outgoing calls. The temporary association may be established based on a determination of the proximity of the mobile terminal to the other terminal, such that the mobile registers to different complex system terminals as it moves between different cells of the system. The temporary relationship between the mobile and a given other terminal may therefore be terminated when the mobile is no longer in proximity to that terminal. Proximity-based registration in accordance with the invention may also be implemented in an embodiment in which the proximity of a given user to a system terminal is determined by detecting a signal transmitted by a beacon device carried by the user.

The dynamic binding and bridging of the invention may be implemented using state-based processing. In an example of this type of implementation, the mobile at a given point in time may be in one of a number of states of operation, such as the following five states: (1) a null state in which there is no temporary association between the mobile and any other terminal of the system; (2) a registered state in which the temporary association is established, but the mobile user has not obtained permission to access the functions of the other terminal; (3) a bound active state in which the temporary association exists and the user is actively accessing the functions of the other terminal to conduct an on-going call; (4) a bound inactive state in which the temporary association exists and the user has obtained permission to access the functions of the other terminal, but is not currently accessing the functions; and (5) a bound alerting state in which the temporary association exists, the user has obtained permission to access the functions of the other terminal, and an in-coming call directed to the mobile generates an alerting indication on the other terminal.

Another aspect of the invention provides techniques for selecting, on a dynamic basis, an interworking function (IWF) that can modify a communication protocol to the particular format required by the bridged terminal equipment. This allows a user to bind to different terminals having different capabilities over the duration of a given call. For example, if the source terminal of the incoming call is a wireless deskset using 32 kbps voice coding and the destination terminal utilizes a DS0 line at 64 kbps, the IWF may be an ADPCM-to-PCM transcoder. An IWF in accordance with the invention may also be used to insert additional data, retrieved from a database of the switch, into a reverse portion of the call directed from the destination terminal to the source terminal. For example, if the call is a video call, and the destination terminal is a terminal without video generating capability, the additional data may be video data retrieved from the database and inserted in a signal delivered from the destination terminal to the source terminal. This aspect of the invention can be used to ensure that the established bandwidth between the destination terminal and the source terminal is substantially bidirectionally symmetric.

Another aspect of the invention relates to overlaying the characteristics of a particular system terminal onto another terminal to which that user is bound. For example, when a given user enters any of the bound states noted above, permission data previously stored for that user may be overlaid onto the bound terminal so that the user may place or receive all calls in accordance with his or her normal restrictions, using the bound terminal. In an illustrative embodiment, a given system user can have multiple stored terminal profiles, one for each type of system terminal that may be accessed by that user. When the user then becomes bound to particular system terminal, the corresponding stored terminal profile of that user is overlaid onto the bound terminal. For example, if the bound terminal is of the same type as a terminal assigned to the user, the functional layout of the assigned terminal, including button assignments and soft-key label arrangements, may be overlaid on the bound terminal such that the bound terminal is configured to operate in a manner similar to the assigned terminal.

These and other features and advantages of the present invention will become more apparent from the accompanying drawings and the following detailed description.

DETAILED DESCRIPTION OF THE INVENTION

The invention will be illustrated below in conjunction with an exemplary wireless communication system. Although particularly well-suited for use in conjunction with a business telephone system, the invention is not limited to use with any particular type of system. The disclosed binding and bridging techniques may be used in any communication application in which it is desirable to provide users with improved access to additional system terminals in an efficient manner. For example, the invention may be applied to handsets for use in cellular and personal communication services (PCS) systems, and to other types of communication devices. The term "mobile" as used herein should therefore be understood to include not only portable wireless handsets as in the illustrative embodiment but also other types of portable communication devices, including wireless personal computers. The term "line" as used herein is intended to include not only telephone lines but more generally any type of communication channel which supplies calls or other communications for processing at one or more user terminals. The term "system administration" or "system administration time" refers generally to a system reconfiguration which involves altering operating parameters for two or more system terminals, and is intended to include, for example, an initial set-up and configuration of the system or a subsequent system-level reconfiguration. The term "dynamic" as applied to establishment of an association between a first user terminal and at least one other terminal of the system refers generally to an association which is established at a time other than during system administration. A "temporary association" is intended to include any association which is established on a dynamic basis as opposed to an association established during system administration.

Figure 1:
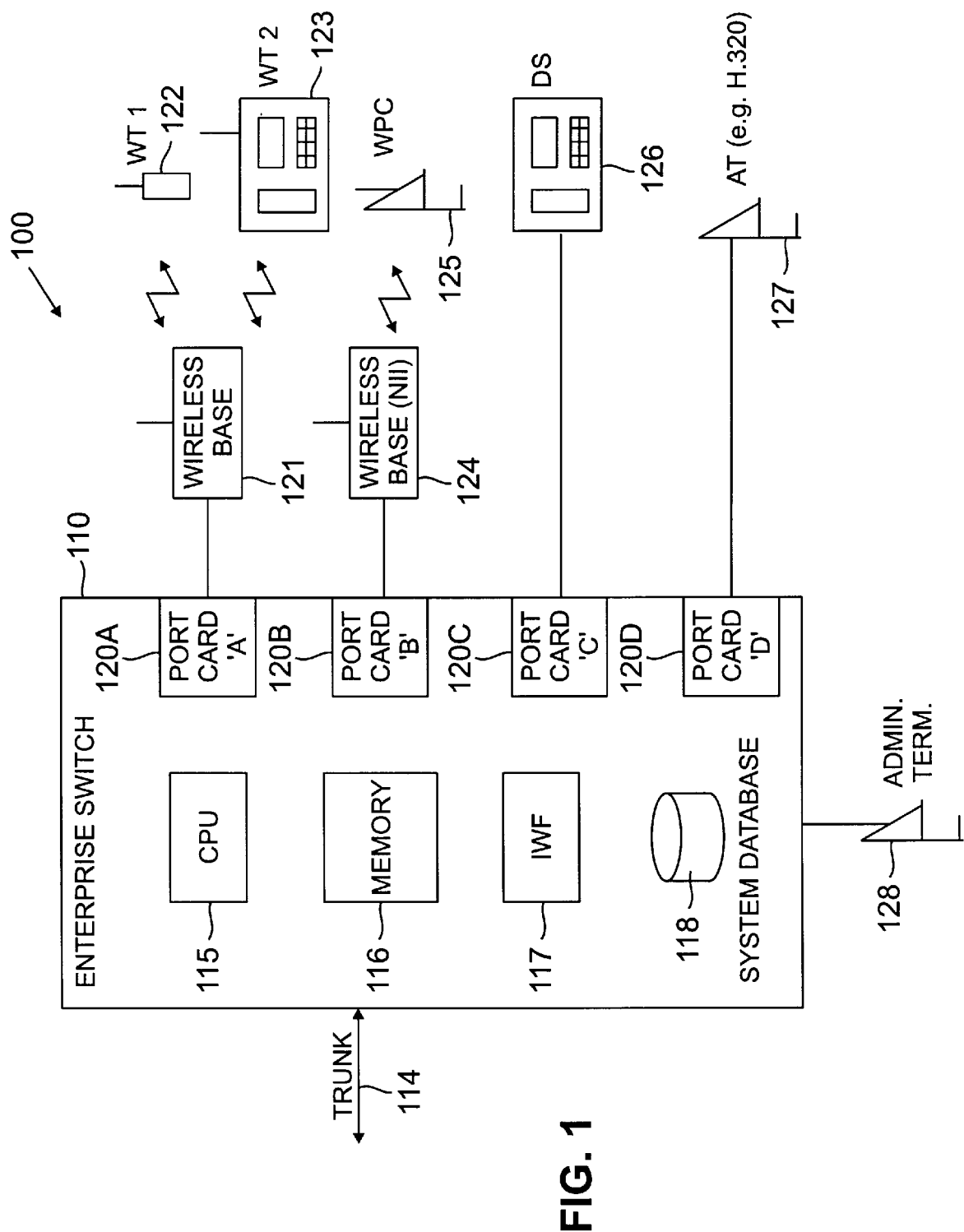
FIG. 1 shows a portion of an exemplary communication system configured in accordance with the invention.

FIG. 1 shows a portion of an exemplary communication system 100 in accordance with an illustrative embodiment of the invention. The system 100 includes an enterprise switch 110 which receives as an input a trunk 114. The trunk 114 supplies incoming calls to the switch 110 for processing. The switch 110 includes a central processing unit (CPU) 115, a memory 116, at least one interworking function (IWF) 117, and a system database 118. The CPU 115 may be a microprocessor, an application-specific integrated circuit (ASIC) or other type of digital data processor, as well as various portions or combination of such elements. The memory 116 may be a random access memory (RAM), a read-only memory (ROM) or combinations of these and other types of electronic memory devices. The IWF 117 is used to provide dynamic binding and bridging features which will be described in greater detail below. The IWF 117 may in other embodiments be incorporated into other elements of switch 110, such as the CPU 115 and memory 116. The system database 118 is used to store bridging and other administrative information regarding the configuration of the system 100.

The switch 110 in this example further includes four port cards 120A, 120B, 120C and 120D. Port card 120A is coupled to a wireless base station 121 which communicates with a simple wireless terminal (WT) 122 designated WT1 and a more complex wireless terminal 123 designated WT2. The terminal WT1 may be a simple mobile telephone, and the terminal WT2 may be a wireless deskset. Port card 120B is connected to a National Information Infrastructure (NII) wireless base station 124, which communicates with a wireless personal computer (WPC) 125. Port card 120C is connected to a wired deskset (DS) 126. Port card 20D is connected to an advanced terminal (AT) 127, which may be, for example, a video telephone operating in accordance with the H.320 standard. It should be noted that the switch 110 may include additional port cards, and may be connected to other types and arrangements of user terminals. The switch 110 is also connected to an administrator terminal 128 which may used to program the operation of the switch 110 during a system administration.

Figure 2:
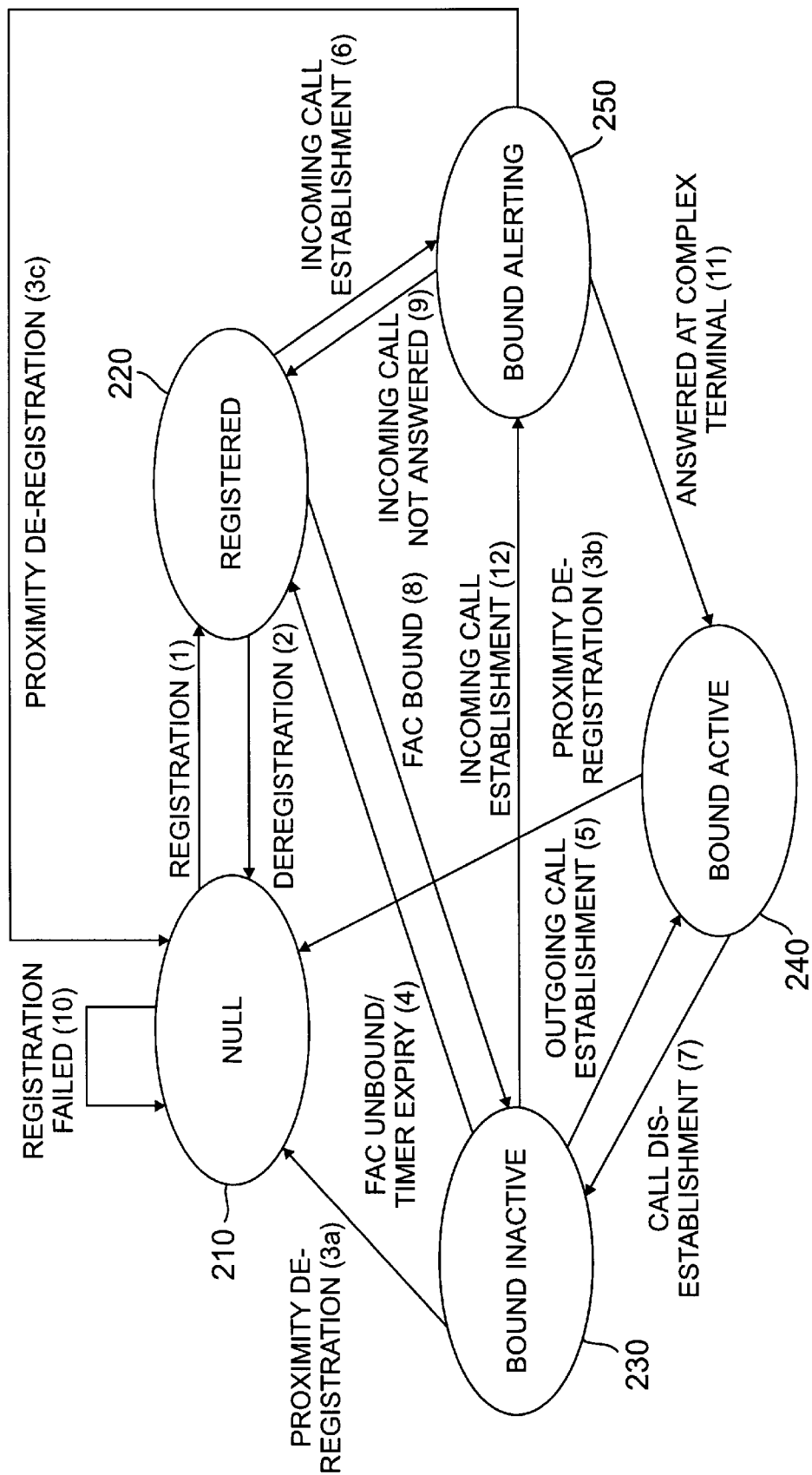
FIG. 2 is a state diagram illustrating the operation of dynamic binding and bridging functions in the system of FIG. 1.

FIG. 2 shows a state diagram illustrating dynamic binding and bridging functions which may be provided in the system 100 of FIG. 1 in accordance with the invention. In this embodiment, it will be assumed that the state diagram shows the possible states for a mobile terminal of the system 100, such as terminal WT1 or WPC. The mobile terminal will also be referred to simply as a "mobile" in the following description. It will be apparent to those skilled in the art that state diagrams similar to that of FIG. 2 can be generated for other types of terminals in the system. The state diagram operations may be implemented, for example, in the form of one or more system software programs stored in memory 116 of switch 110 and executed by CPU 115. Such software will be referred to herein as "system software" or "switch software." The state diagram of FIG. 2 in this embodiment includes the following five states: Null (210), Registered (220), Bound Inactive (230), Bound Active (240) and Bound Alerting (250). A given mobile terminal begins in the Null state, and depending on user input and other system parameters and conditions, it may pass through one or more of the other states. The possible state transitions are shown as arrows connecting the states in the state diagram. FIGS. 3 through 12 below illustrate the state transitions in greater detail. Each of the state transitions is numbered in FIG. 2, and that number appears below in the heading of the description of the corresponding transition. Unless otherwise specified, the description of FIGS. 3 through 12 will be of an embodiment in which a mobile binds to a deskset. It should be understood, however, that the invention is not limited to such embodiments, but can instead be used to provide dynamic binding between a mobile and any other type of communication terminal or terminals.

The state transitions of FIG. 2 make use of information in the following tables. These tables may be stored, for example, in system database 118 of switch 110. In the tables, all items marked with a "*" are status information elements that are filled in dynamically during binding and bridging operations. All other items are static and are filled in during system administration.

TABLE 1

User Profile Table

| User ID (UID) | Directory Number (DN) | Terminal Type | Button Assignmts BID FID | Home TID | Deskset TID | Attributes (e.g., timer) |
|---|---|---|---|---|---|---|
| epf | (732)957-1234 | WT | B1 CA<br>B2 CA | 2 | 5 | T1 = 120 |
| adb | (732)957-5678 | WT | B1 CA<br>B2 CA | 4 | 5 | T1 = 120 |
| desk | (732)957-9101 | 7434 | B1 LWC<br>B2 CF | 5 | NULL | |
| epf | NULL | BT | NULL | 2 | NULL | |

The User Profile Table lists information characterizing the current system configuration for each of the system users. Each user is identified by a User Identifier (UID). A given UID is associated with a corresponding Directory Number (DN), a Terminal Type, Button Assignments, a Home Terminal Identifier (TID), a Deskset TID, and various Attributes. The DN represents the primary number which callers dial to be connected to the corresponding user. The Terminal Type specifies what type of terminal (e.g., mobile terminal (WT1), wireless deskset (WT2), wireless personal computer (WPC), wired deskset (such as a type 7434 wired deskset from Lucent Technologies Inc.), etc.) the user is equipped with. The Button Assignments include a Button Identifier (BID) and corresponding Function Identifier (FID) for each of a number of programmable buttons on the user terminal. For example, BID B I for UID "epf" in the User Profile Table is set to a call appearance (CA) function, and BID B2 for UID "desk" is set to provide a call forwarding (CF) function. The FID designation LWC corresponds to a leave-word calling function. The Home TID identifies the terminal which is considered the "home" terminal for the user. This may be, for example, the deskset in the user's office. The Deskset TID identifies a deskset terminal to which the user is bound, and therefore varies as the user binds to different system terminals. The Attributes may include, for example, a Timer T1 which is specified at system administration time and indicates how long the user may remain bound to a particular terminal without receiving or placing a call there.

TABLE 2

Permission Table

| UID | COR | Password Authentication |
|---|---|---|
| epf | 2 | epf password |
| adb | 2 | adb password |
| desk | 4 | NULL |

The Permission Table stores information which permits the system to authenticate users trying to access system functions. The Class of Restriction (COR) equates to a definition of a user's authorization to place and receive calls. In the above example, passwords are stored in the Password Authentication field for each of the UIDs "epf" and "adb." The UID "desk" does not require any user authentication, that is, any user is permitted to place a call or execute functions from that terminal. Its Password Authentication field is therefore NULL in Table 2. All of the information in the Permission Table is entered at system administration.

TABLE 3

Terminal Profile Table

| TID | Terminal Type | Port ID* | Binding State* |
|---|---|---|---|
| 2 | WT | 0x1a | BOUND ACTIVE |
| 4 | WT | 0x1b | REGISTERED |
| 5 | 7434 | 0x2a | BOUND ACTIVE |
| 6 | BT | 0x2b | NULL |

The Terminal Profile Table stores information regarding the Terminal Type, Port Identifier (Port ID) and Binding State for each of a number terminals. The terminals are identified by TID. The Port ID identifies, for example, the port card and line over which the corresponding terminal communicates with the switch 110. The Binding State entry specifies whether the terminal is in the Bound Active, Bound Inactive, Bound Altering, Registered or Null state. For example, the terminal with TID 2 in Table 3 is a wireless terminal which is currently communicating over Port 0x1a and is in the Bound Active state 240. Both the Port ID and the Binding State change dynamically as different users bind to the terminal, while the Terminal Type for the terminal is established at system administration.

TABLE 4

Port Capability Table

| Port ID | Physical Location (slot/port) | Cell ID (proximity) |
|---|---|---|
| 0x1a | 5 | 12 |
| 0x1b | 6 | 12 |
| 0x2a | 7 | 12 |
| 0x2b | 8 | 12 |

The Port Capability Table lists the Physical Location for each of the possible Port IDs in the system. The Physical Location may include, for example, slot and port identifiers for the corresponding Port IDs. A Cell Identifier (Cell ID) is also included for each of the Port IDs. The Cell ID specifies which cell of a radio subsystem of system 100 includes the terminal which is communicating over the specified Port ID. For non-mobile terminals, the Cell ID may be filled in at system administration time, if applicable. The radio subsystem is used to implement "proximity based" dynamic binding as will be described in conjunction with FIGS. 3 and 4 below. The proximity based binding allows a user with a simple mobile terminal to bind with a more complex terminal which is located in the same proximity. The correspondence between Cell IDs/Port IDs and TIDs can change as, for example, mobile terminals move within the system.

TABLE 5

Binding Table

| UID* | Visiting TID* | Timer On/Off* |
|---|---|---|
| epf | 5 | on |

The Binding Table specifies information regarding which users are bound to which terminals, as well as characteristics of the binding. In the example above, the user with UID "epf" is bound to the terminal with TID 5. The Timer for the binding, which as noted above may specify the amount of time the user can remain bound to the terminal but inactive, is turned on. The entries of this table vary dynamically as different users bind to different terminals in the system.

TABLE 6

Binding Group Definition Table

| Deskset TID | Mobile UIDs | Registered* UIDs | Bound UID* |
|---|---|---|---|
| 5 | epf, adb | epf, adb | epf |

The Binding Group Definition Table specifies the users which are registered and/or bound to a particular terminal in the system. The Mobile UIDs column represents a pre-administered list of mobile terminal users that are allowed to bind to a given deskset TID. In the example shown in the table, the users with UIDS "epf" and "adb" are in the pre-administered list permitted to bind to the deskset terminal with TID 5. The group of users which are registered to bind to a given terminal at a particular point in time are referred to herein as the "binding group" for the given terminal. These users are listed in the Registered UIDs column for that terminal. In the example, the users with UIDS "epf" and "adb" are also registered to bind to the deskset terminal with TID 5. One of the users in the binding group may actually be bound to the terminal on an on-going call. This user is listed in the Bound UID column for that terminal. In general, only one user at a time is permitted to bind to a given terminal, but multiple users can register to bind to that terminal.

In accordance with the invention, binding groups may be created at system administration time, or by user invocation of a designated Feature Access Code (FAC), or by a combination of both of these techniques. At system administration time, the administrator can assign known individuals to groups, and then relate the groups to either designated terminals or designated groups of terminals. This information may be stored in the system database 118 of switch 110 for use during normal system operation. Alternatively, certain users can be authorized to access the system database 118 during system operation and dynamically add or delete members to or from the Binding Group Definition Table in the system database. These authorized users could be identified at system administration time, or could be provided with an authorization code. Entry of such a code would allow the user to access the system database in order to enter definitions of new groups, update definitions of the existing groups, and establish or delete group relationships with the system terminals.

TABLE 7

Terminal Capability Table

| Terminal Type | Signaling Protocol | Display Size | Feature Buttons | Transport Type | Coding Type |
|---|---|---|---|---|---|
| 7400 | DCP | 2 × 16 | 12 | DS0 | 64K PCM |
| AT1 | H.320 | NULL | NULL | 6 × DS0 | |
| AT2 | ATM | NULL | NULL | CBR/AAL1 | |
| WT | DECT | | | 32K | ADPCM |
| BT | DECT | NULL | NULL | NULL | NULL |

The Terminal Capability Table includes information regarding the capabilities of the various terminals of the system. This information includes, for example, the Signaling Protocol, Display Size, Feature Buttons, Transport Type and Coding Type for a given specified Terminal Type. For example, the table shows that Advanced Terminal Type 2 (AT2) uses an asynchronous transfer mode (ATM) Signaling Protocol and a constrained bit rate (CBR)/ATM Adaptation Layer 1 (AAL1) transport stream structure. All of this information may be entered at system administration.

TABLE 8

Facility-Coding Type Table

| Facility ID | Call Type | Coding Type |
|---|---|---|
| 0001 | Voice | PCM |
| 0001 | Video | H.320 |
| 0101 | Voice | ADPCM |

The Facility-Coding Type Table specifies Call Type and Coding Type of each of a number of communication facilities supported by the system 100. For example, the table indicates that the facility with Facility ID 0001 supports both PCM voice calls and H.320 video calls. As this information is typically static, it can be entered at system administration.

REGISTRATION (1) & (10)

Figure 3:
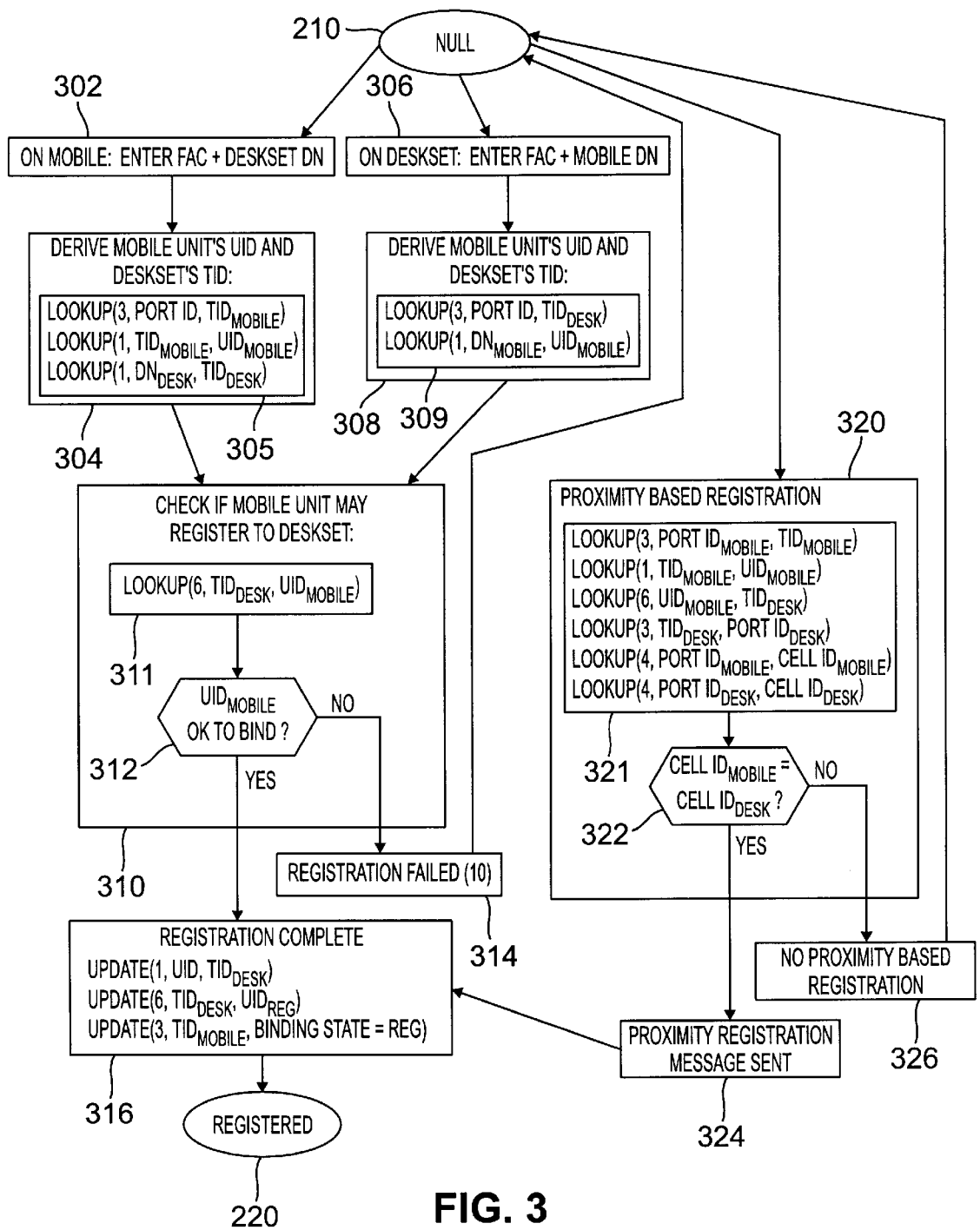
FIGS. 3 through 12 are flow diagrams illustrating in more detail the operation of the state transitions shown in the state diagram of FIG. 2.

FIG. 3 illustrates the following three different cases in which a given mobile can "register" with a deskset terminal, that is, move from the Null state 210 to the Registered state 220 of FIG. 2: (i) the user dials a Registration Feature Access Code (FAC) followed by a deskset Directory Number (DN) from the mobile; (ii) the user dials the Registration FAC followed by the mobile DN from the deskset; or (iii) the mobile fulfills a proximity based registration condition for the deskset. In any of these cases, the mobile registers to become part of the binding group of the deskset, such that it becomes eligible to subsequently "bind" to the deskset. The processing for case (i) begins in step 302 of FIG. 3 with the user entering the Registration FAC followed by the deskset DN at the mobile. In step 304 the system derives the UID of the mobile and the TID of the specified deskset. This involves a number of Lookup operations which are listed in 305. These and all other Lookup operations in this description are written in the form Lookup (n, x, y), where n specifies the table number of one of TABLES 1 through 8 above, x is a key into the specified table, and y identifies the information to be retrieved from the table. For example, the operation Lookup (3, Port ID, $TID_{Mobil}$) in 305 causes the system to perform a look-up in the Terminal Profile Table (Table 3) using the Port ID of the mobile as a key in order to obtain the TID of the mobile. Since the deskset DN is dialed from the mobile, the physical port that this number comes in on can be used to identify the Port ID on which the mobile communicates. The mobile TID is then used as a key into the User Profile Table (Table 1) in order to obtain the UID of the mobile. The DN of the deskset is used as a key into the User Profile Table to obtain the TID of the deskset.

The processing for case (ii) begins with the user entering the Registration FAC followed by the mobile DN from the deskset in step 306. In step 308, the system derives the LID of the mobile and the TID of the deskset using the two Lookup operations specified in 309. The operation Lookup (3, Port ID, $TID_{Desk}$) causes the system to perform a look-up in the Terminal Profile Table (Table 3) using the Port ID of the deskset as a key in order to obtain the TID of the deskset. Since the mobile DN is dialed from the deskset, the physical port that this number comes in can be used to identify the Port ID on which the deskset communicates. The DN of the mobile is then used as a key into the User Profile Table (Table 1) to obtain the LID of the mobile.

The processing for both cases (i) and (ii) continues in step 310 in which a determination is made as to whether the mobile can register to the deskset. In step 311, the Binding Group Definition Table (Table 6) is searched using the deskset TID as a key to attempt to locate the mobile UID in the set of mobile UID entries associated with the deskset TID. Step 312 checks whether the mobile UID is listed with the deskset TID in the Binding Group Definition Table and is therefore permitted to bind to that deskset. If the mobile UID is not permitted to bind to the deskset, the registration is deemed to have failed as indicated in step 314, and the mobile remains in the Null state. If the mobile is permitted to bind to the deskset, the registration is deemed to be completed, and the update operations in step 316 are performed. The update operations are written using the same format described above for the Lookup operations. For example, the operation Update (1, UID, $TID_{Desk}$) in step 316 specifies that the User Profile Table (Table 1) is updated to include the deskset TID for the mobile LID. In the other update operations of step 316, the Binding Group Definition Table (Table 6) is updated to indicate that the mobile UID is a registered LID for the deskset TID, and the Terminal Profile Table (Table 3) is updated to include a Binding State entry of REGISTERED for the mobile TID. The state of the mobile then goes to Registered, and the mobile is a member of the binding group for the deskset.

Case (iii) above is referred to as "proximity based registration" and begins in step 320 with the Lookup operations listed in 321. When the mobile comes within the coverage of a particular cell of the system, the Port ID of the mobile is used as a key into the Terminal Profile Table (Table 3) to obtain the mobile TID. The mobile TID is used as a key into the User Profile Table (Table 1) to obtain the mobile UID. The mobile UID is used as a key into the Binding Group Definition Table (Table 6) to obtain a viable deskset TIED. That deskset TID is used as a key into the Terminal Profile Table to obtain the associated Port ID of the deskset. The deskset Port ID is used as a key into the Port Capability Table (Table 4) to determine the Cell IED of the cell in closest proximity to the specified Port ID. The mobile Port ID is also used as a key into the Port Capability Table to find the Cell ID associated with the mobile Port ID. Step 322 determines if the deskset and mobile Cell IDs match. If the two Cell IDs match, a proximity based registration message is sent in step 324, the update operations of step 316 are performed, and the mobile enters the Registered state. If the two Cell IDs do not match, step 326 indicates that there will be no proximity based registration, and the mobile returns to the Null state.

In the Registered state 220, the data from the User Profile Table and the Permission Table are available. Therefore, when a specific user transits the state machine of FIG. 2 to any of the Bound states, the permission data of that user may be overlaid onto the bound terminal so that the user may place or receive all calls in accordance with his or her normal restrictions, using the bound terminal. A given system user can have multiple stored terminal profiles, one for each type of system terminal that may be accessed by that user. When the user then becomes bound to particular system terminal, the corresponding stored terminal profile of that user is overlaid onto the bound terminal. If the bound terminal is of the same type as a terminal assigned to the user, the functional layout of the assigned terminal, including button assignments and soft-key label arrangements, may be overlaid on the bound terminal such that the bound terminal is configured to operate in a manner similar to the assigned terminal. For example, the layout of a given deskset assigned to the user may be overlaid onto another otherwise unrelated deskset of the same or a similar type to which the user becomes bound.

DEREGISTRATION (2)

Figure 4:
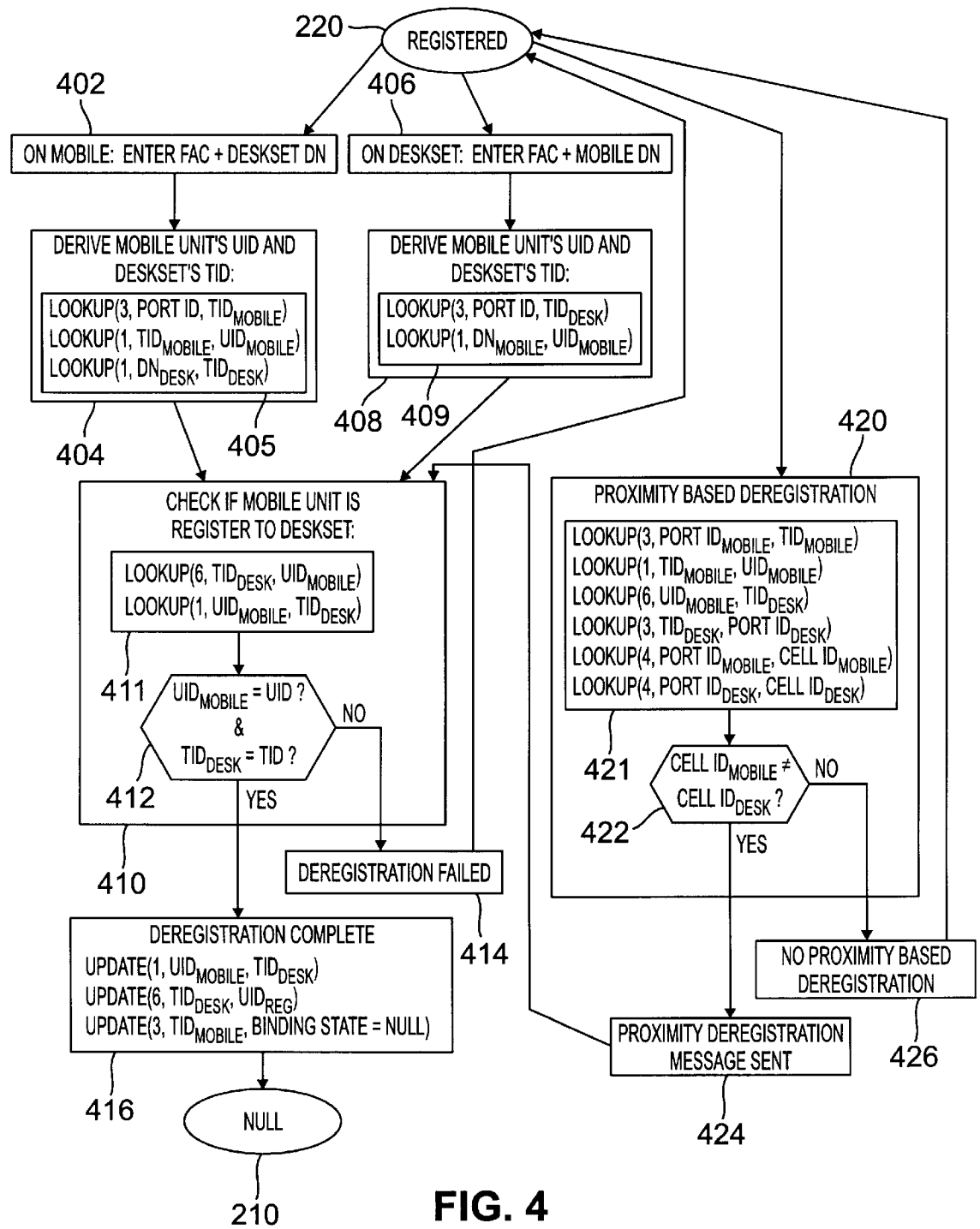

FIG. 4 illustrates the following three different cases in which a given mobile can "deregister" or move from the Registered state 220 to the Null state 210 of FIG. 2: (i) the user dials a Deregistration FAC followed by a deskset DN from the mobile; (ii) the user dials the Deregistration FAC followed by the mobile DN from the deskset; or (iii) the mobile fulfills a proximity based deregistration condition for the deskset. In each these cases, the mobile is removed from the binding group of the deskset, and is therefore no longer eligible to bind with that deskset. The processing for case (i) begins in step 402 of FIG. 4 with the user entering the Deregistration FAC followed by the deskset DN at the mobile. In step 404 the system derives the UID of the mobile and the TID of the specified deskset, by performing the Lookup operations listed in 405. The system searches the Terminal Profile Table (Table 3) using the Port ID of the mobile as a key in order to obtain the TID of the mobile. The mobile TID is then used as a key into the User Profile Table (Table 1) in order to obtain the UID of the mobile. The DN of the deskset is used as a key into the User Profile Table to obtain the TID of the deskset.

The processing for case (ii) begins with the user entering the Deregistration FAC followed by the mobile DN from the deskset in step 406. In step 408, the system derives the UID of the mobile and the TID of the deskset using the two Lookup operations specified in 409. The operation Lookup (3, Port ID, $TID_{Desk}$) causes the system to perform a look-up in the Terminal Profile Table (Table 3), using the Port ID of the deskset as a key, in order to obtain the TID of the deskset. The DN of the mobile is then used as a key into the User Profile Table (Table 1) to obtain the UID of the mobile.

Case (iii) above is referred to as "proximity based deregistration" and begins in step 420 with the Lookup operations listed in 421. When the mobile goes outside the coverage of a particular cell of the system, the Port ID of the mobile is used as a key into the Terminal Profile Table (Table 3) to obtain the mobile TID. The mobile TID is used as a key into the User Profile Table (Table 1) to obtain the mobile UID. The mobile UID is used as a key into the Binding Group Definition Table (Table 6) to obtain the associated deskset TID. That deskset TID is used as a key into the Terminal Profile Table to obtain the associated Port ID of the deskset. The deskset Port ID is used as a key into the Port Capability Table (Table 4) to determine the Cell ID of the cell in closest proximity to the specified Port ID. The mobile Port ID is also used as a key into the Port Capability Table to find the Cell ID associated with the mobile Port ID. Step 422 determines if the deskset and mobile Cell IDs match. If the two Cell IDs do not match, a proximity based deregistration message is sent in step 424, and the process moves to step 410. If the two Cell IDs do match, step 426 indicates that there will be no proximity based deregistration, and the mobile returns to the Registered state.

The processing for each of cases (i), (ii) and (iii) above continues in step 410 in which a determination is made as to whether the mobile is actually registered to the deskset. In step 411, the Binding Group Definition Table (Table 6) is searched using the deskset TID as a key to attempt to locate the mobile UID in the set of mobile UID entries registered to the deskset TID. The User Profile Table (Table 1) is also searched using the mobile UID to determine if it is registered to the deskset TID. Step 412 checks whether the mobile UID is listed with the deskset TID in the Binding Group Definition Table and whether the deskset TID is listed with the mobile UID in the User Profile Table. If either one of these conditions fails, the mobile UID is not permitted to deregister from the deskset, the deregistration is deemed to have failed as indicated in step 414, and the mobile remains in the Registered state. If both of the conditions in step 412 pass, the deregistration is deemed to be completed, and the update operations in step 416 are performed. The User Profile Table (Table 1) is updated to clear the deskset TID for the mobile UID, the Binding Group Definition Table (Table 6) is updated to indicate that the mobile UID is no longer a registered UID for the deskset TID, and the Terminal Profile Table (Table 3) is updated to include a Binding State entry of NULL for the mobile TID. The state of the mobile then goes to Null.

PROXIMITY DEACTIVATION (3a, 3b, 3c)

Figure 5:
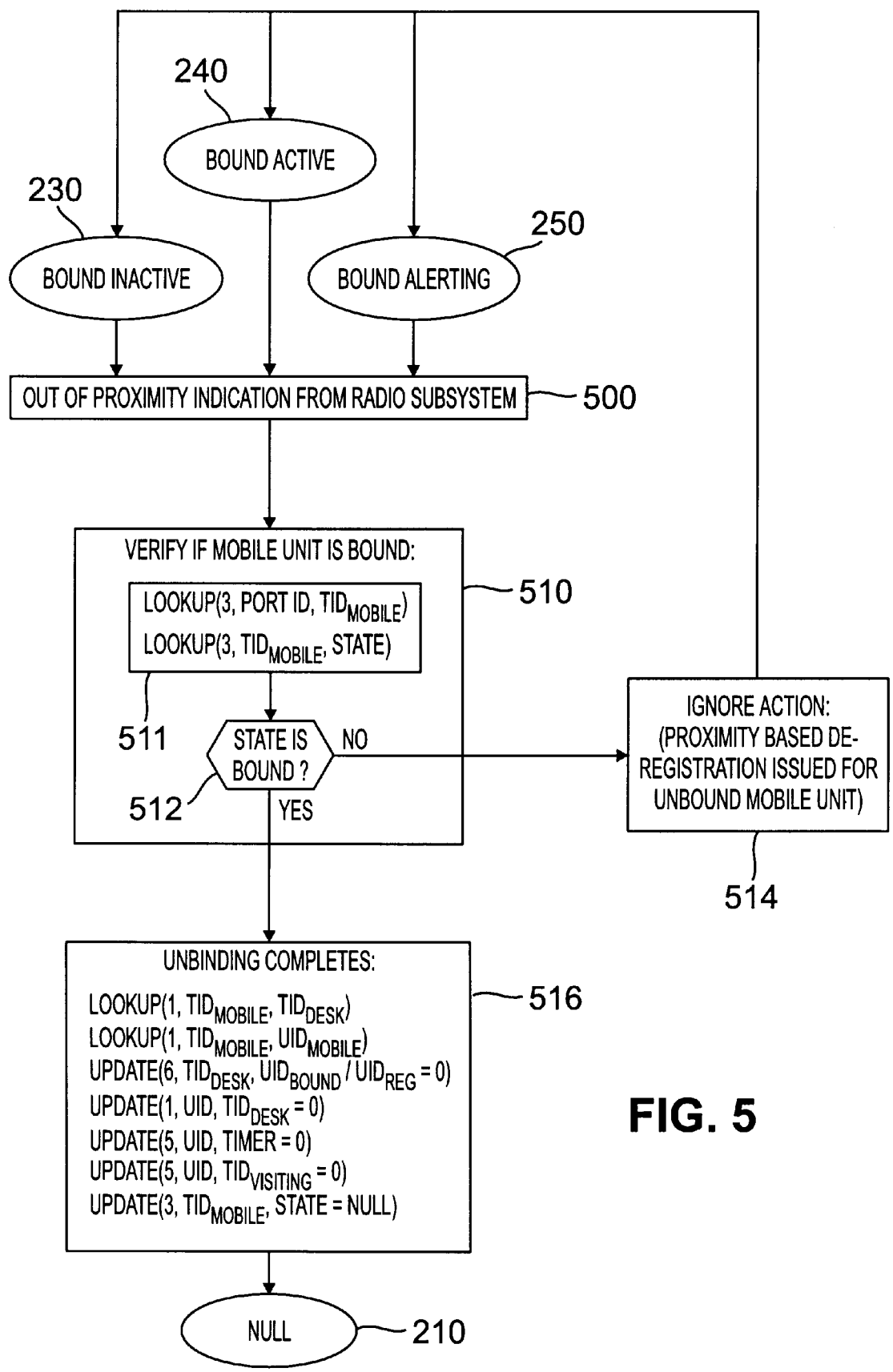

FIG. 5 illustrates the manner in which a mobile transitions from the Bound Inactive state 230, the Bound Active state 240 or the Bound Alerting state 250, to the Null state 210 of FIG. 2. These three transitions can arise as follows:

Bound Inactive→Null (Transition 3a). After completing a call while being bound to another terminal, and waiting to place or receive another call while remaining bound to that terminal, the mobile is taken out of proximity of the above-noted radio subsystem.

Bound Active→Null (Transition 3b). While active on a call and bound to another terminal, the mobile is taken out of proximity of the radio subsystem.

Bound Alerting→Null (Transition 3c). After an incoming call is established for the mobile and the deskset is alerting with a simulated bridged appearance, the mobile is taken out of proximity of the radio subsystem.

For each of the transitions (3a), (3b) and (3c) described above and shown in FIG. 2, the mobile receives an "out of proximity" indication from the radio subsystem as shown in step 500. This out of proximity indication may be generated in accordance with step 420 of FIG. 4. After the out of proximity indication is received, step 510 verifies if the mobile is bound. This involves performing the Lookup operations listed at 511. When the mobile receives the out of proximity indication, the corresponding message comes in on a physical Port ID on which the mobile communicates. The system uses this Port ID as a key into the Terminal Profile Table (Table 3) to obtain the TID of the mobile. The system then uses the mobile TID as a key into the Terminal Profile Table to obtain the Binding State of the mobile. If the mobile is bound, the Binding State will be one of the following states: Bound Active, Bound Inactive or Bound Alerting. Step 512 determines if the Binding State of the mobile is one of these three valid bound states. If the Binding State of the mobile is not a valid bound state, step 514 indicates that the out of proximity indication is ignored because a proximity based deregistration was issued for an unbound mobile. If the Binding State of the mobile is one of the three valid binding states, then the mobile is unbound and then de-registered, using the operations of step 516.

The unbinding process of step 516 first determines the deskset to which the mobile is currently bound. The system uses the mobile TID as a key into the User Profile Table (Table 1) to obtain the TID of this deskset. The system does another look-up in the User Profile Table, using the mobile TID as the key, and obtains the UID of the mobile. To unbind the mobile, an update is done to the Binding Group Definition Table (Table 6). The system uses the deskset TID as a key into the Binding Group Definition Table and removes the mobile UID as the Bound UID. To de-register the mobile, another update is done to the Binding Group Definition Table. The system uses the deskset TID as a key into the Binding Group Definition Table and removes the mobile UID from the list of Registered UIDs. These two updates to the Binding Group Definition Table correspond to the operation Update (6, $TID_{Desk}$, $UID_{Bound}/UID_{Reg}=0$) in step 516. Next, in order to disassociate the deskset from the mobile, an update is done to the User Profile Table (Table 1) to remove the deskset TID associated with the mobile UID. This update is performed by using the mobile UID as a key into the User Profile Table and setting the Deskset TID field entry to NULL. The Binding Table (Table 5), which keeps track of all current mobile users that are bound, is updated to remove the mobile user that went out of proximity. The mobile UID is used as a key into the Binding Table, and all elements associated with the mobile UID are removed. This involves setting the Timer, Visiting TID and UID fields to NULL. Finally, the mobile TID is used as a key into the Terminal Profile Table (Table 3), and the Binding State associated with the mobile TID is set to NULL. The mobile is thereby transitioned to the Null state 210.

FAC UNBOUND and TIMER EXPIRY (4)

Figure 6:
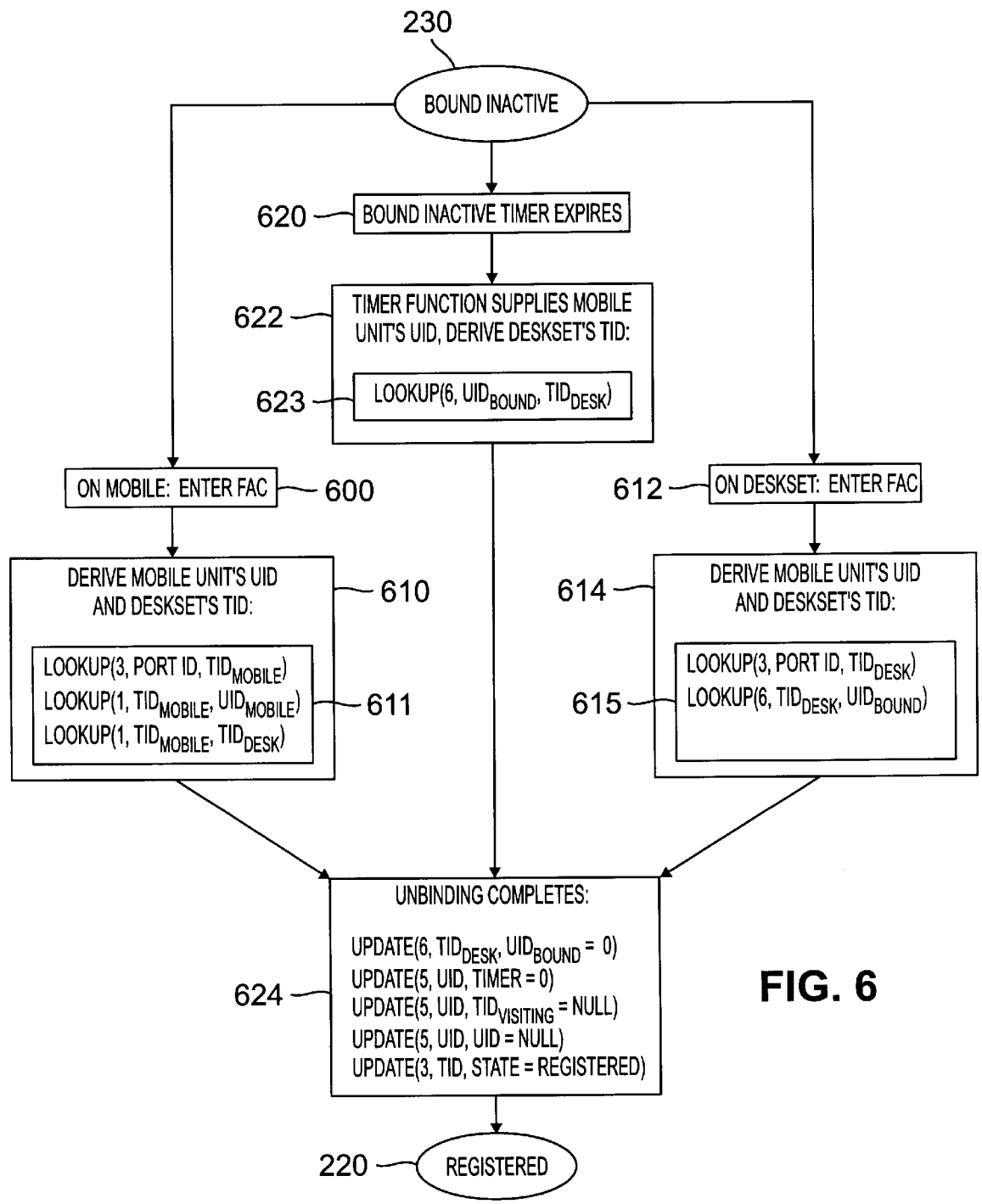

FIG. 6 illustrates the manner in which a mobile transitions from the Bound Inactive state 230 to the Registered state 220 of FIG. 2. This transition can occur in the following cases: (i) the user enters the Unbinding FAC followed by the deskset DN from the mobile, (ii) the user enters the Unbinding FAC followed by the mobile DN from the deskset; or (iii) the timer for the mobile UID to remain in a bound state expires. For all three of these cases, the mobile UID and the deskset TID are needed in order to make the necessary system updates to transition the mobile to the Registered state.

The processing for case (i) begins when the user enters the Unbinding FAC from the mobile in step 600. The corresponding message comes in on a physical Port ID on which the mobile communicates. The system in one of the Lookup operations 611 of step 610 uses this Port ID as a key into the Terminal Profile Table (Table 3) and extracts the TID of the mobile. In order to determine the UID of the mobile, the system does a look-up in the User Profile Table (Table 1), using the mobile TID as the key, and extracts the mobile UID. In order to determine the deskset TID, another look-up is done in the User Profile Table using the mobile TID as the key and the deskset TID is extracted.

The processing for case (ii) begins when the user enters the Unbinding FAC from the deskset in step 612. The corresponding message comes in on a physical Port ID on which the deskset communicates. The system in one of the Lookup operations 615 of step 614 uses this Port ID as a key into the Terminal Profile Table (Table 3) and extracts the TID of the deskset. In order to determine the UID of the mobile, the system performs a look-up into the Binding Group Definition Table (Table 6), using the deskset TID as the key, and extracts the mobile UID as the UID bound to the deskset.

The processing for case (iii) begins when the Timer expires in step 620. The Timer function in step 622 then supplies the mobile UID. In order to determine the deskset TID, a look-up step 623 is performed in the Binding Group Definition Table (Table 6), using the mobile UID (i.e., the Bound UID) as the key, and the deskset TID is extracted.

After the mobile UID and the deskset TID are obtained in cases (i), (ii) or (iii) in the manner described above, the processing continues with step 624. The mobile UID is first unbound from the deskset by making an update to the Binding Group Definition Table (Table 6). Using the deskset TID as the key into the Binding Group Definition Table, the associated Bound UID is set to NULL. Next, the Binding Table (Table 5), which keeps track of all current mobile users that are bound, is updated to remove the mobile user. The mobile UID is used as a key into the Binding Table, and all elements associated with the mobile UID are removed. This involves setting the Timer, Visiting TID and UID fields to NULL. Finally, the mobile TID is used as a key into the Terminal Profile Table (Table 3), and the Binding State associated with the mobile TID is set to REGISTERED. The mobile is thereby transitioned to the Registered state 220.

OUTGOING CALL ESTABLISHMENT (5)

Figure 7:
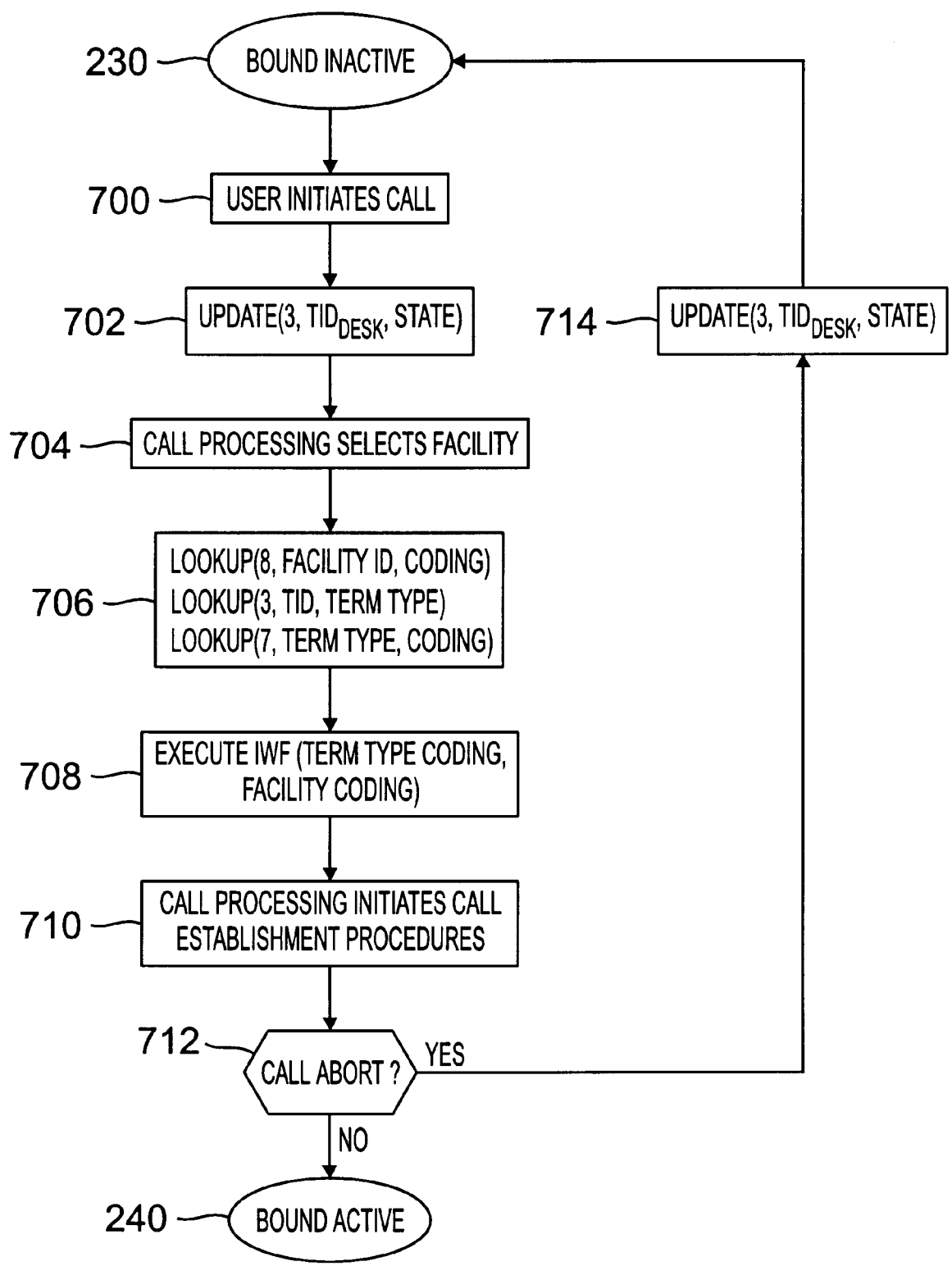

FIG. 7 illustrates the manner in which a mobile transitions from the Bound Inactive state 230 to the Bound Active state 240 of FIG. 2. This transition is initiated in step 700 when a user places a call when its mobile is in the Bound Inactive state. It will be assumed for this example that the mobile is bound to a deskset from which the call is placed. This deskset will also be referred to as the originating terminal. The system detects the call placement, and in step 702 updates the Terminal Profile Table (Table 3) to reflect the fact that the deskset to which the mobile is bound is in the Bound state. The system in step 704 then executes a well-known facility selection routine and declares a specific network facility to be dedicated to the current call instance associated with the bound terminal. This generally involves selecting a facility which has a bandwidth equal to or greater than that required by the originating terminal. The system in step 706 uses the Facility ID of the selected facility as a key into the Facility-Coding Type Table (Table 8) to determine the Coding Type of the selected facility. The system then uses the TID of the originating terminal as a key into the Terminal Profile Table, and extracts the Term Type. The Term Type is used as a key into the Terminal Capability Table (Table 7) to determine the Coding Type and Transport Type requirements of the originating terminal.

The system in step 708 executes an appropriate interworking function (IWF) for the transport stream in order to align the bandwidth, Coding Type and Transport Type of the originating terminal and the selected facility, if necessary. The IWF is "inserted" into the call path. For example, if the originating terminal is a wireless deskset using 32 kbps voice coding and the selected network facility is a DS0 line at 64 kbps, the system in step 708 may insert an ADPCM-to-PCM transcoder for interworking the voice call. The system then initiates call establishment procedures in step 710. If the user is determined in step 712 to have aborted the call, the system returns the originating terminal to the Bound Inactive state, by updating the state of that terminal in the Terminal Profile Table as indicated in step 714. If the user has not aborted the call, the mobile completes the transition to the Bound Active state 240.

INCOMING CALL ESTABLISHMENT (6) & (12)

Figure 8:
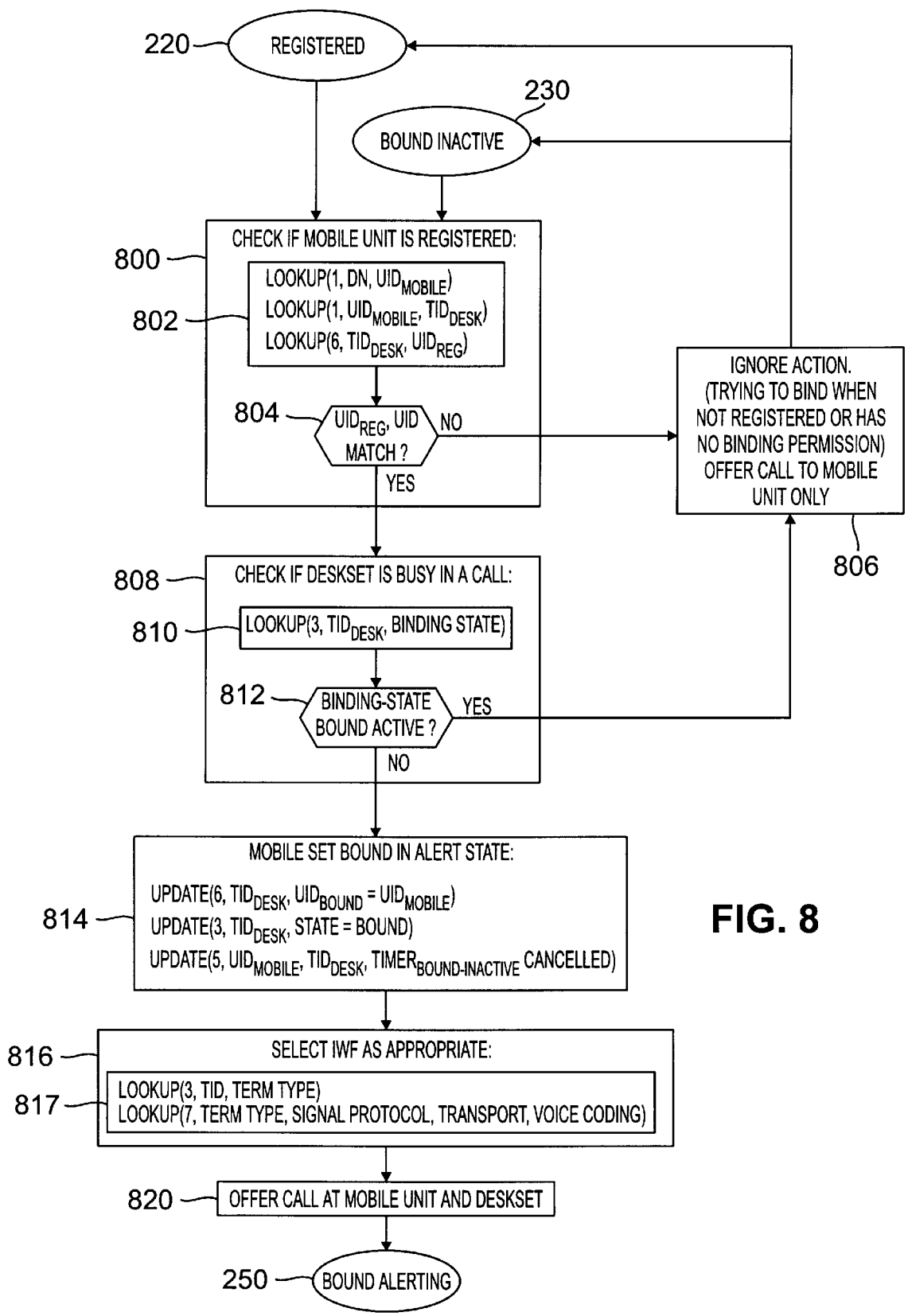

FIG. 8 illustrates the manner in which a mobile transitions from the Registered state 220 to the Bound Alerting state 250, which is transition (6) in FIG. 2, or from the Bound Inactive state 230 to the Bound Alerting state 250, which is transition (12). Transition (6) occurs in the event of an incoming call to a mobile which has been successfully registered to a binding group. Transition (12) occurs in the event of an incoming call to a mobile which has been successfully bound to a binding group. For both transitions, it is assumed that the mobile has not been active in a call. The incoming call to the mobile has been originated by the calling party which may be, for example, a voice-only telephone or an advanced terminal. The calling party initiates the incoming call by dialing the DN of the mobile.

In the exemplary process shown in FIG. 8, the incoming call is directed to a registered mobile through the DN dialed by the calling party. The switch software implements the process steps of FIG. 8 in order to route the call. Step 800 checks if the mobile has been registered to the binding group. This involves the Lookup operations shown in 802. The dialed DN is first used as a key into the User Profile Table (Table 1) to determine the associated UID of the mobile. The mobile UID is then used as a key into the User Profile Table to determine the TID of the associated deskset. The deskset TID is used as a key into the Binding Group Definition Table (Table 6) to locate the registered UIDs for that deskset. Step 804 determines if any of the registered UIDs match the UID of the mobile. If there is no match, or if the registered UID entry for the deskset TID is NULL, the addressed mobile is not bound to any binding group, and the switch continues the normal call routing to the mobile, as shown in step 806. The mobile then returns to the Registered state.

If there is a match between the registered UID for the deskset and the mobile UID, the system in step 808 checks if the deskset is busy with an on-going call. The deskset TID is used in Lookup operation 810 as a key into the Terminal Profile Table (Table 3) to extract the Binding State entry for the deskset. Step 812 checks whether the Binding State entry for the deskset is BOUND ACTIVE. If the Binding State entry is BOUND ACTIVE, the deskset is busy with another active call, so the incoming call is offered to the mobile only as shown in step 806, and the process returns to either the Bound Inactive or Registered state. If the Binding State entry for the deskset is not BOUND ACTIVE, the deskset is idle. The mobile then begins it transition to the Bound Alerting state with the update operations in step 814. The Bound UID of the deskset is updated in the Binding Group Definition Table (Table 6) to the mobile UID, the Binding State of the deskset is updated in the Terminal Profile Table (Table 3) to BOUND ACTIVE, and the Bound-Inactive Timer associated with the mobile UID and the deskset TID in the Binding Table (Table 5) is canceled.

In step 816, an appropriate IWF is selected for the incoming call. The selection of an IWF makes use of information retrieved in the Lookup operations 817. The Terminal Type of the deskset is retrieved from the Terminal Profile Table (Table 3) using the deskset TID as a key. The Terminal Type is then used as key into the Terminal Capability Table (Table 7) to retrieve the Signaling Protocol, Transport Type, Coding Type and Display Size for the deskset. The Lookup operations 817 may include another Lookup operation, not shown in FIG. 8, which uses the mobile UID and Terminal Type as keys into the User Profile Table (Table 1) in order to retrieve the Button Assignments information associated with the mobile UID. The incoming call is then offered at both the mobile and the deskset, as indicated in step 820. Appropriate "alerting" is therefore generated for both the deskset and the mobile. This completes the transition of the mobile to the Bound Alerting state.

CALL DIS-ESTABLISHMENT (7)

Figure 9:
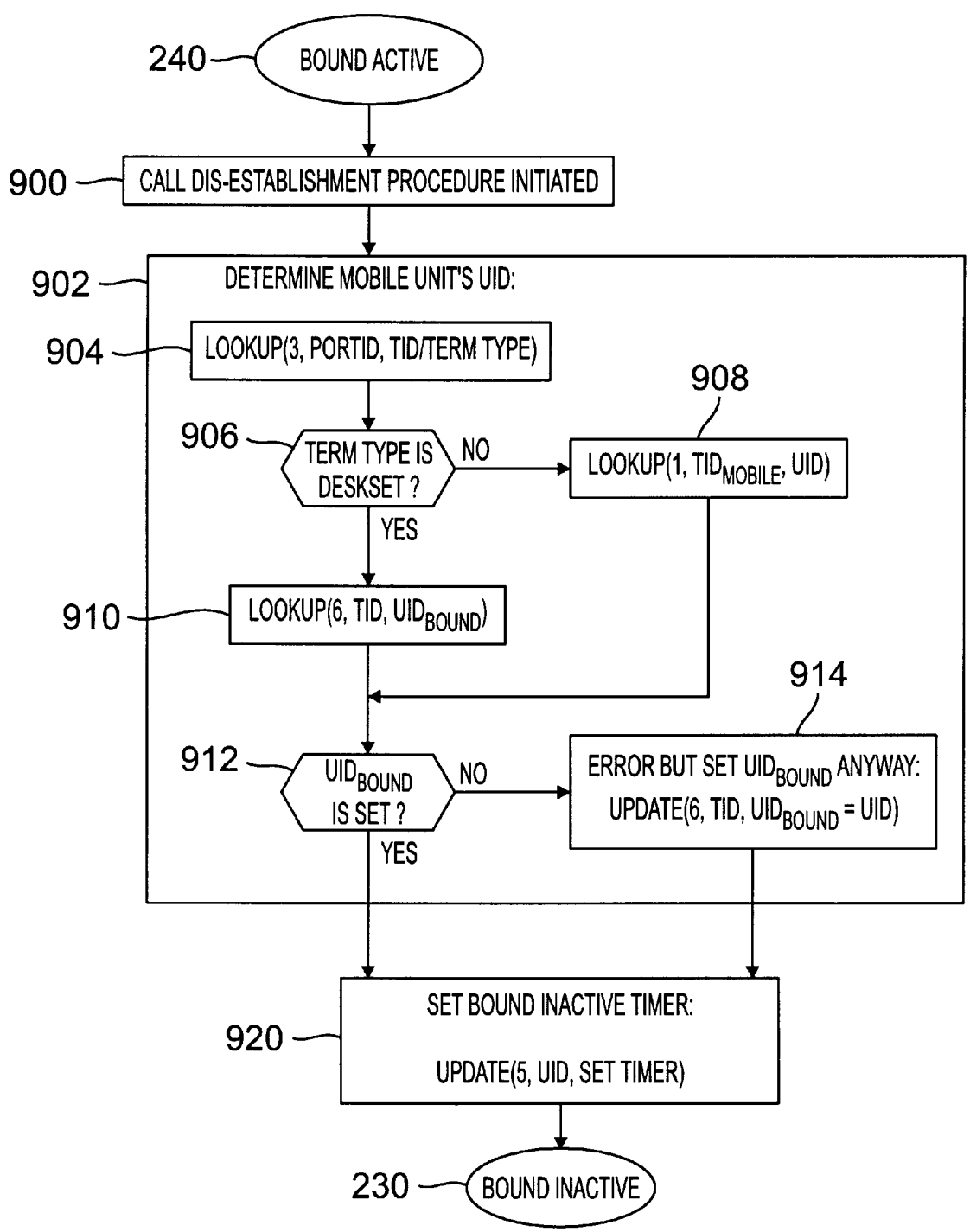

FIG. 9 shows the manner in which a mobile moves from the Bound Active state 240 to the Bound Inactive state 230 of FIG. 2 when the mobile is released from a call. The call dis-establishment procedure is initiated in step 900. As part of this procedure, the system releases the call from the mobile or deskset. The system in step 902 then determines the mobile UID. The Lookup operation 904 uses the Port ID of the terminal released from the call as a key into the Terminal Profile Table (Table 3) to retrieve the TID and the Terminal Type of that terminal. Step 906 then determines if the resulting Terminal Type is a deskset. If the resulting Terminal Type is not a deskset, then the call must have been released from the mobile. The system then in step 908 retrieves the mobile UID from the User Profile Table (Table 1) using the TID of the mobile as a key. If the Terminal Type is determined in step 906 to be a deskset, step 910 uses the TID of the deskset as a key into the Binding Group Definition Table (Table 6) to retrieve the Bound UID for the deskset. In either case, step 912 determines whether the Bound UID for the deskset is set to the mobile UID. If the Bound UID for deskset is set to the mobile UID, the process moves to step 920. If the Bound UID for the deskset is not set, this is an error condition, and the Bound UID for the deskset is set to the mobile UID in step 914 before the process moves to step 920. In step 920, the Bound Interactive Time timer is set in the Binding Table (FIG. 5) for the mobile UID entry. This completes the transition and the mobile moves into the Bound Inactive state.

FAC BOUND (8)

Figure 10:
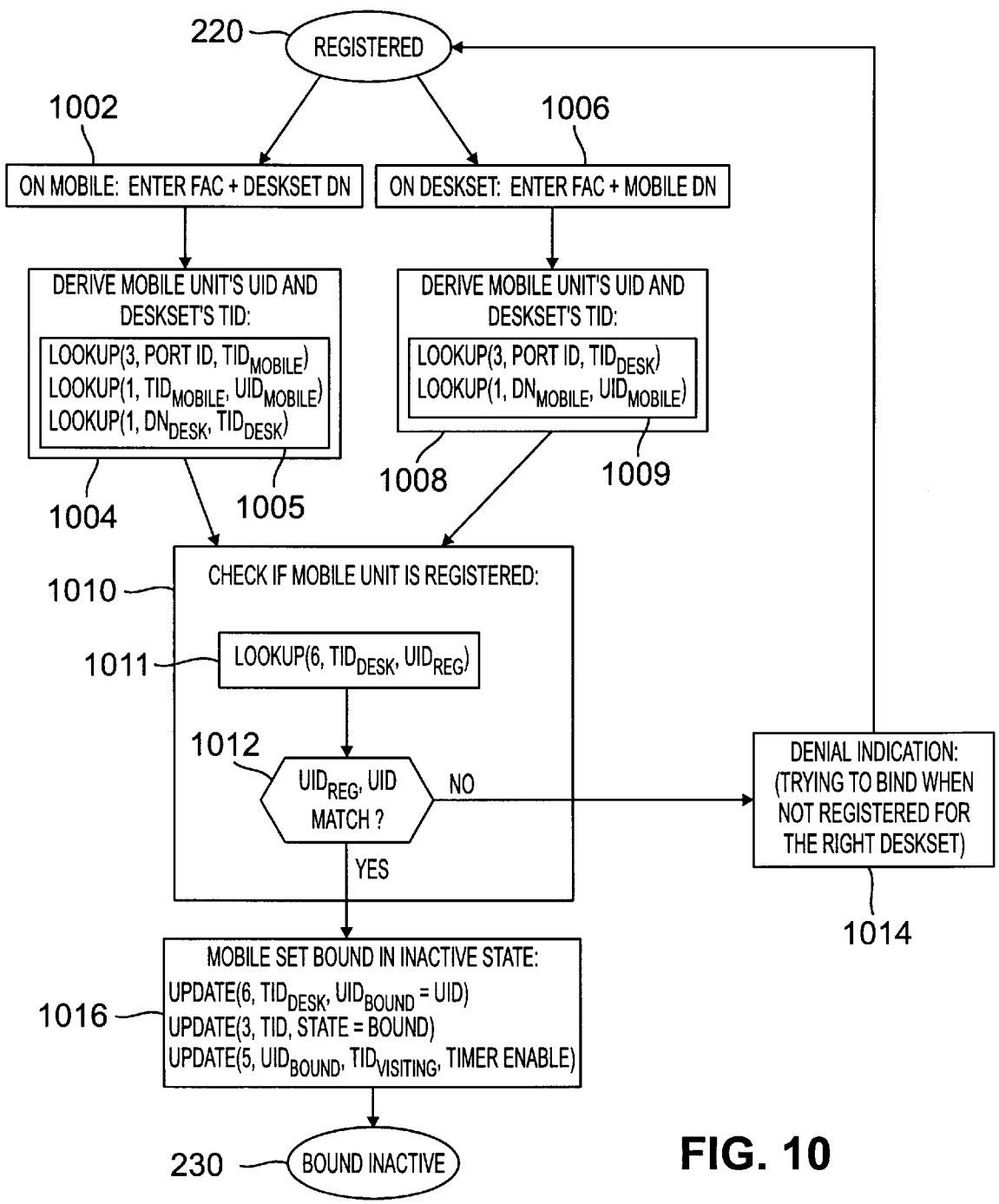

FIG. 10 illustrates the following two different cases in which a given mobile can move from the Registered state 220 to the Bound Inactive state 230 of FIG. 2: (i) the user dials a Binding FAC followed by a deskset DN from the mobile; or (ii) the user dials the Binding FAC followed by the mobile DN from the deskset to be bound. The processing for case (i) begins in step 1002 of FIG. 2 with the user entering the Binding FAC followed by the deskset DN at the mobile. In step 1004 the system derives the UID of the mobile and the TID of the specified deskset, by performing the Lookup operations listed in 1005. The system searches the Terminal Profile Table (Table 3) using the Port ID of the mobile as a key in order to obtain the TID of the mobile. The mobile TID is then used as a key into the User Profile Table (Table 1) in order to obtain the UID of the mobile. The DN of the deskset is used as a key into the User Profile Table to obtain the TID of the deskset. The processing for case (ii) begins with the user entering the Binding FAC followed by the mobile DN from the deskset in step 1006. In step 1008, the system derives the UID of the mobile and the TID of the deskset using the two Lookup operations specified in 1009. The operation Lookup (3, Port ID, $TID_{Desk}$) causes the system to perform a look-up in the Terminal Profile Table (Table 3) using the Port ID of the deskset as a key to obtain the TID of the deskset. The DN of the mobile is then used as a key into the User Profile Table (Table 1) to obtain the UID of the mobile.

The processing for cases (i) and (ii) continues in step 1010 in which a determination is made as to whether the mobile is actually registered to the deskset. In step 1011, the Binding Group Definition Table (Table 6) is searched using the deskset TID as a key to attempt to locate the mobile UID in the set of UID entries registered to the binding group of the deskset. Step 1012 checks whether the mobile UID is listed with the deskset TID in the Binding Group Definition Table. If the mobile UID does not match one of the registered UIDs for the deskset, the binding request is denied in step 1014. This indicates either that the mobile is not registered to the deskset DN supplied in step 1002, or the deskset has no registered mobile in the binding group that matches the mobile DN supplied in step 1006. As a result, the mobile remains in the Registered state. If it is determined in step 1012 that the mobile UID does match a registered UID for the deskset, the mobile is permitted to bind to that deskset, and the update operations in step 1016 are performed. The Binding Group Definition Table (Table 6) is updated to indicate that the mobile UID is a Bound UID for the deskset, the Terminal Profile Table (Table 3) is updated to include the Binding State entry of BOUND for the mobile TID, and the Binding Table (Table 5) is updated to set the Visiting TID to the deskset TID and to enable the Bound Inactive Timer. The state of the mobile then goes to Bound Inactive.

INCOMING CALL NOT ANSWERED (9)

Figure 11:
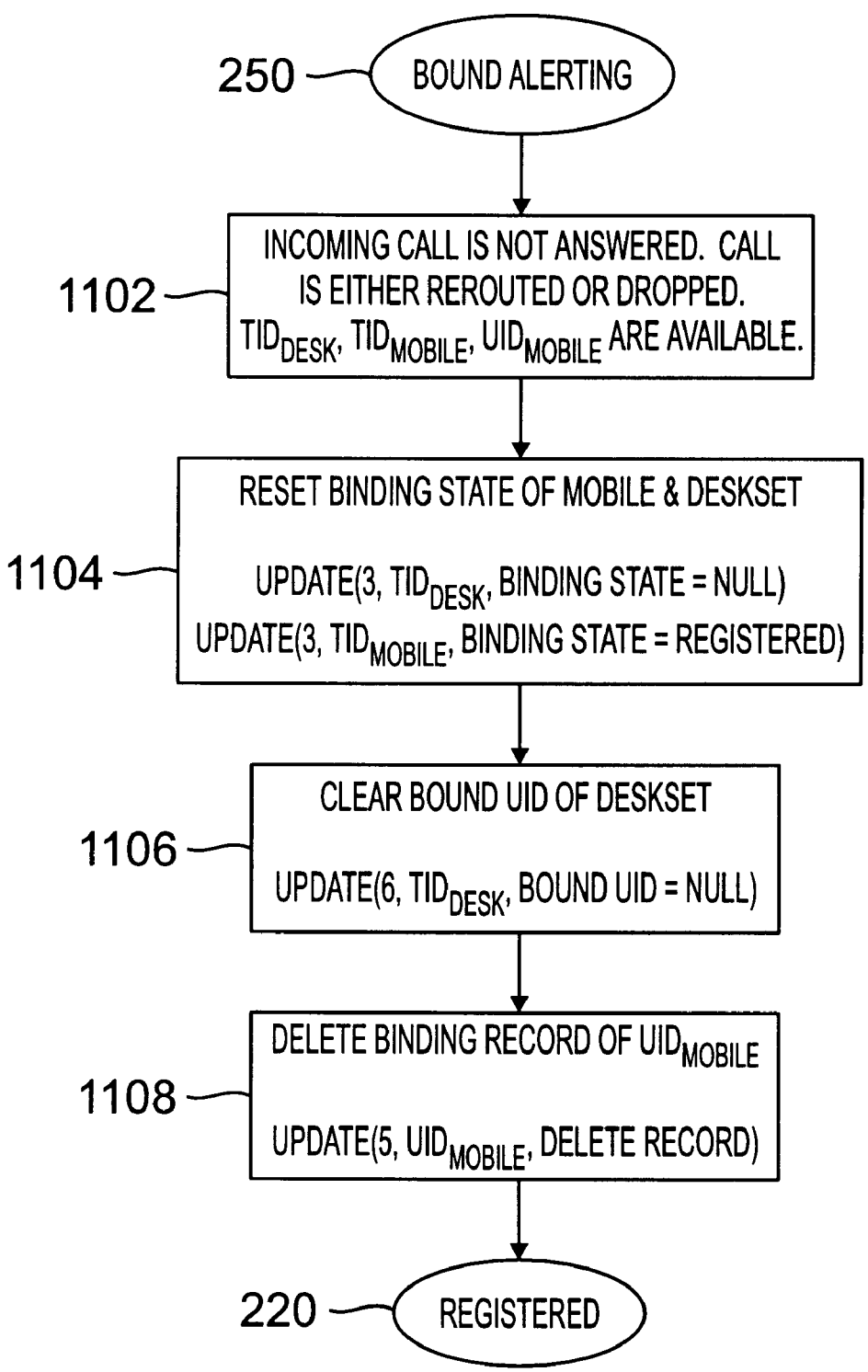

FIG. 11 illustrates the manner in which a given mobile can move from the Bound Alerting state 250 to the Registered state 220 of FIG. 2. When the mobile is in the Bound Alerting state, both the bound deskset of the binding group and the mobile can answer the incoming call. In step 1102, an incoming call is not answered at either the bound deskset or the mobile. The call may therefore be rerouted by the switch or dropped by the called party. Information such as the TID of the deskset, the TID of the mobile, and the UID of the mobile are available in the switch while the incoming call is rerouted or disconnected. Step 1104 resets the Binding State of the mobile and the deskset, by updating the Binding State information in the Terminal Profile Table (Table 3) to NULL for the deskset TID and to REGISTERED for the mobile TID. Step 1106 clears the Bound UID information for the deskset TID in the Binding Group Definition Table (Table 6) to NULL. Step 1108 deletes the entire binding record of the mobile UID from the Binding Table (Table 5) using the operation Update (5, $UID_{Mobile}$, delete). The mobile then returns to the Registered state as shown.

INCOMING CALL ANSWERED AT COMPLEX TERMINAL (11)

Figure 12:
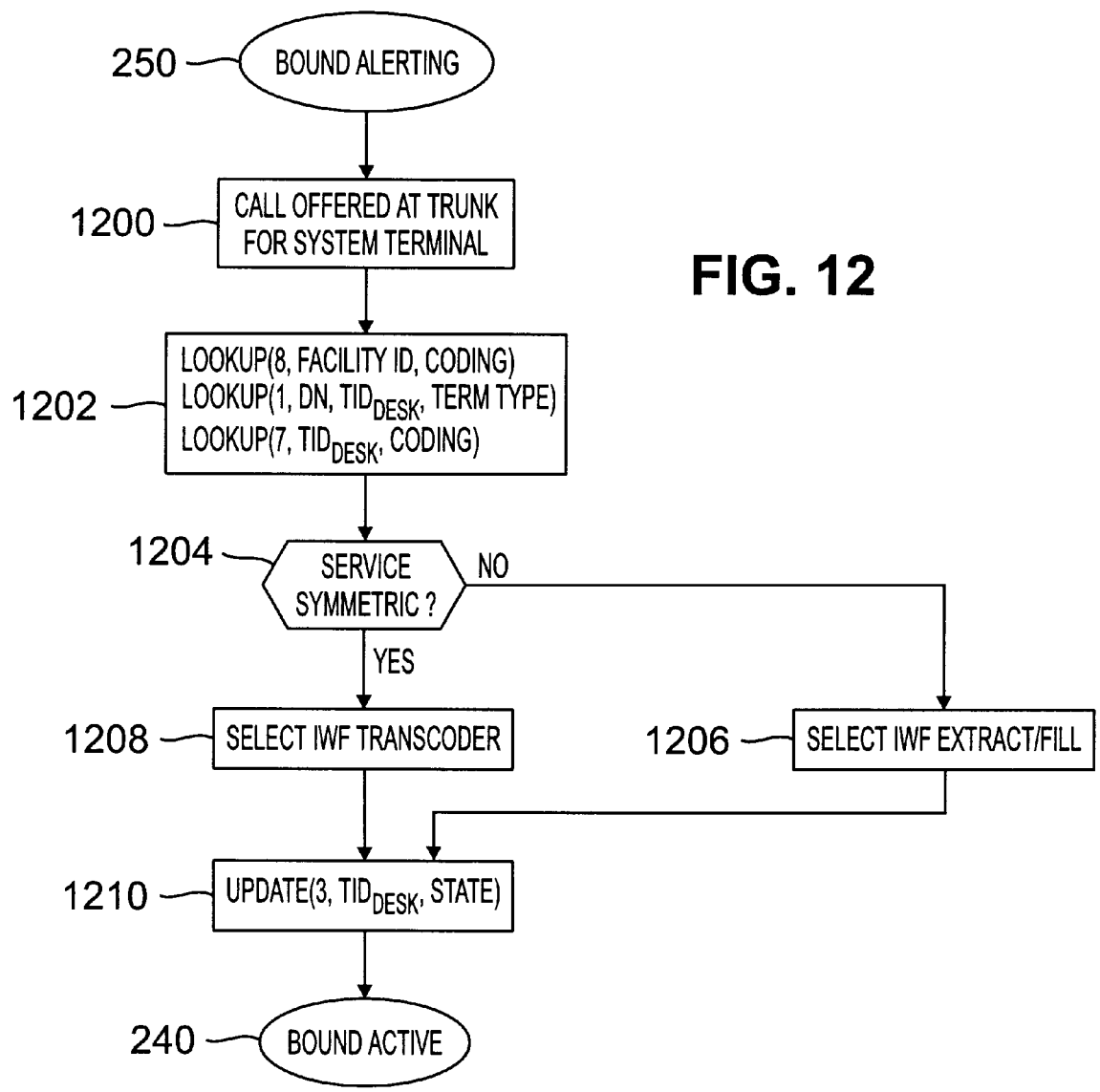

FIG. 12 illustrates the manner in which a given mobile can move from the Bound Alerting state 250 to the Bound Active state 240 of FIG. 2. In step 1200, an incoming call arrives at the trunk 114 destined for a particular terminal of system 100. The call may not be end-to-end symmetric in that, for example, its bandwidth, coding type and/or service type may not be consistent throughout the network. During the transition from the Bound Alerting to the Bound Active state, the system therefore verifies the bandwidth and network coding type for the call, and checks the destination terminal profile for compatibility. This part of the process is implemented in steps 1202 and 1204 of FIG. 12. In step 1202, the Facility ID associated with the destination terminal is used as a key in the Facility-Coding Type Table (Table 8) to obtain the Coding Type for the terminal. It will be assumed for purposes of illustration that the destination terminal is a deskset. The DN from the incoming call is used as a key in the User Profile Table (Table 1) to obtain the Terminal Type and TID of the deskset. The deskset TID is then used as a key in the Terminal Capability Table (Table 7) to obtain the Coding Type for the deskset.

A determination is then made in step 1204 as to whether the bandwidth, coding type and service type of the incoming call are "symmetric" with the corresponding parameters of the destination deskset. If the call and deskset parameters are not symmetric, an IWF is selected in step 1206 to provide extract/fill operations which are designed to smooth out the asymmetry between the call and deskset parameters. If the call and deskset parameters are symmetric, an IWF transcoder is selected in step 1208. In either case, step 1210 updates the Binding State entry for the deskset TID in the Terminal Profile Table (Table 3) to BOUND ACTIVE. This completes the transition of the mobile to the Bound Active state.

In the simplest case of the operation of the process of FIG. 12, the incoming call is end-to-end symmetric from its source terminal to the destination terminal, and the IWF transcoder selected in step 1208 may be a NULL IWF. However, there may be many cases in which such symmetry does not exist. For example, in the case of Transition (5) described above, both the bandwidth and voice coding scheme of the call may be interworked using an appropriate IWF transcoder designed to match the capabilities of the destination terminal to those of the source. Another case of this type is one in which the incoming call is a multimedia call, but the destination terminal is not capable of multimedia support. In this case, the system determines that there is a service mismatch (as well as a bandwidth and coding mismatch), and initiates IWF procedures to allow the call to be delivered to the destination terminal. By way of example, assume that an H.320 call arrives at the network trunk 114, destined for a user who is bound to the wireless deskset WT2 of FIG. 1. The system decodes the H.320 transport stream, and extracts the voice samples. These voice samples are then transcoded to match the capabilities of the bound terminal WT2, and delivered to the user. As one possible additional feature related to this example, the IWF may be configured to provide preset video data in the reverse (i.e., outbound) direction, such that the established bandwidth between the system terminal and source of the H.320 call is bidirectionally symmetric. Since the deskset WT2 itself is not capable of generating this preset video data to insert in the reverse direction, the IWF may extract such video data from the system database 118 and insert it in the outbound transport stream.

It should be noted that during the life of a call, since the call can be bridged between the mobile and a more complex terminal, and such bridged appearances can be created by proximity to the complex terminal, the IWF selection steps may have to be executed multiple times. For example, assume a user binds to a complex terminal in a particular location, and accepts a call there. During the call, the user, utilizing the bridged call appearance on the mobile, moves the call to the mobile, and moves to a different area. Upon reaching the new location, the user is detected to be in proximity to a new complex terminal. A new IWF may then be invoked when the user enters the Bound Active state at the new terminal.

In one possible alternative embodiment of the invention, a given user is supplied with a device which is configured to signal user identification (UID) information for that user. Such a device could be implemented within an employee identification badge worn by the user, or in the form of a small "button" which could be attached to the user's clothing or worn as a necklace. In a wireless environment, such a device is generally referred to as a beacon. A system in accordance with the invention may be configured to utilize the beacon to track the location of the user, such that a call received for the user is directed to the deskset or other complex terminal which the system determines is closest to the user at that particular time. Although this type of proximity-based registration may be implemented in a manner similar to that described above for mobile terminals, it will not include a bridging operation if the beacon device carried by the user does not support transport channels or a user interface.

A beacon-directed call processing function can be activated by user entry of a feature access code (FAC) and/or depression of a feature button. Alternatively, it may be implemented in a fully automated manner. In the feature-activated implementation, the system tracks beacon signals only when directed to do so by user commands. In the fully-automated implementation, beacon-to-terminal proximity relationships may be determined on an a priori basis, and used for all routing. The system could first check user location as defined by his or her corresponding beacon location before performing any beacon-directed call routing for that user. Tables 1, 3, 4 and 7 above include entries relating to a beacon terminal (BT) for implementing a beacon-directed call processing function. For example, the User Profile Table (Table 1) indicates that the user having UID "epf" is equipped with a beacon device. This embodiment of the invention may be used, for example, to route incoming calls to the user at the closest system terminal, to allow the user to access functions of a stored user-defined terminal profile at the closest system terminal, as well as in other applications.

The above-described embodiments of the invention are intended to be illustrative only. These and numerous other alternative embodiments within the scope of the following claims will be apparent to those skilled in the art.

What is claimed is:

1. A method of processing calls in a switch of a communication system, the method comprising the steps of:

establishing an association in the switch between a first user terminal and at least one other terminal of the system, based on proximity of the first terminal to the other terminal, wherein the proximity of the first terminal to the other terminal is determined at least in part utilizing a cell identifier of the first terminal and a cell identifier of the other terminal, the cell identifier for a given one of the terminals specifying a cell of the system in which the given terminal is currently located; and permitting a user assigned to the first terminal to access functions of the other terminal while the association exists.

2. The method of claim 1 further including the step of terminating the association between the first terminal and the other terminal when the first terminal is no longer within sufficient proximity to the other terminal.

3. An apparatus for processing calls in a switch of a communication system, comprising:

a memory for storing information regarding an association established in the switch between a first user terminal and at least one other terminal of the system, wherein the association is established based on proximity of the first terminal to the other terminal, and wherein the proximity of the first terminal to the other terminal is determined at least in part utilizing a cell identifier of the first terminal and a cell identifier of the other terminal, the cell identifier for a given one of the terminals specifying a cell of the system in which the given terminal is currently located; and a processor coupled to the memory and operative to process calls in the switch such that a user assigned to the first terminal can access functions of the other terminal while the association exists.

4. The apparatus of claim 3 wherein the processor is further operative to terminate the association between the first terminal and the other terminal when the first terminal is no longer within sufficient proximity to the other terminal.

5. A method of processing calls in a switch of a communication system, the method comprising the steps of:

detecting a signal transmitted by a device associated with a user of the system, the signal including information identifying the user;

establishing an association between a first terminal of the system assigned to the user and a second terminal of the system which is determined to be in proximity to that user based on the detected signal, wherein the proximity of the second terminal to the user is determined at least in part, utilizing a cell identifier of the second terminal and a cell identifier of the device associated with the user, the cell identifier for a given one of the second terminal and the device specifying a cell of the system in which the given terminal or device is currently located.

6. The method of claim 5 further including the step of routing an incoming call directed to the user to the second terminal.

7. The method of claim 5 wherein the detecting step includes detecting a signal transmitted by a beacon device carried by the user.

8. The method of claim 5 further including the step of permitting the user to access user-defined functions of the first terminal at the second terminal.

9. The method of claim 5 wherein the detecting step is initiated in response to entry of a proximity-based registration command by the user.

10. An apparatus for processing calls in a switch of a communication system, comprising:

a processor for establishing an association between a first terminal of the system assigned to a given user and a second terminal of the system which is determined to be in proximity to that user, based on detection of an identifying signal transmitted by a device associated with that user, wherein the proximity of the second terminal to the user is determined at least in part utilizing a cell identifier of the second terminal and a cell identifier of the device associated with the user, the cell identifier for a given one of the second terminal and the device specifying a cell of the system in which the given terminal or device is currently located; and a memory for storing information regarding the association between the first terminal and the second terminal.

11. The apparatus of claim 10 wherein the processor is further operative to route an incoming call directed to the user to the second terminal.

12. The apparatus of claim 10 wherein the signal is transmitted by a beacon device carried by the user.

13. The apparatus of claim 10 wherein the user is permitted to access user-defined functions of the first terminal at the second terminal.

14. The apparatus of claim 10 wherein the processor is further operative to initiate detection of the signal in response to entry of a proximity-based registration command by the user.

* * * * *